Oct. 13, 1936.  L. E. ALLEN  2,057,356
DRIVE MECHANISM FOR HOT METAL MIXERS AND THE LIKE
Filed Feb. 20, 1933  3 Sheets-Sheet 1
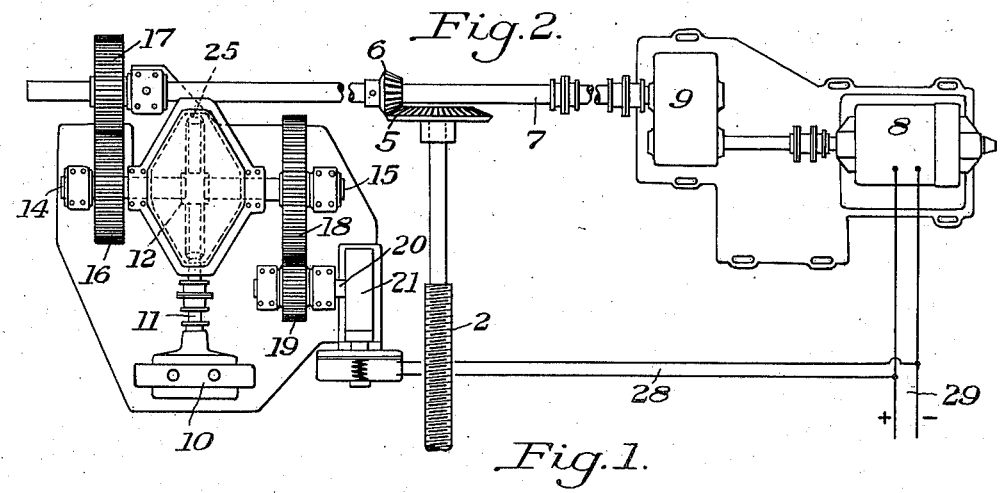
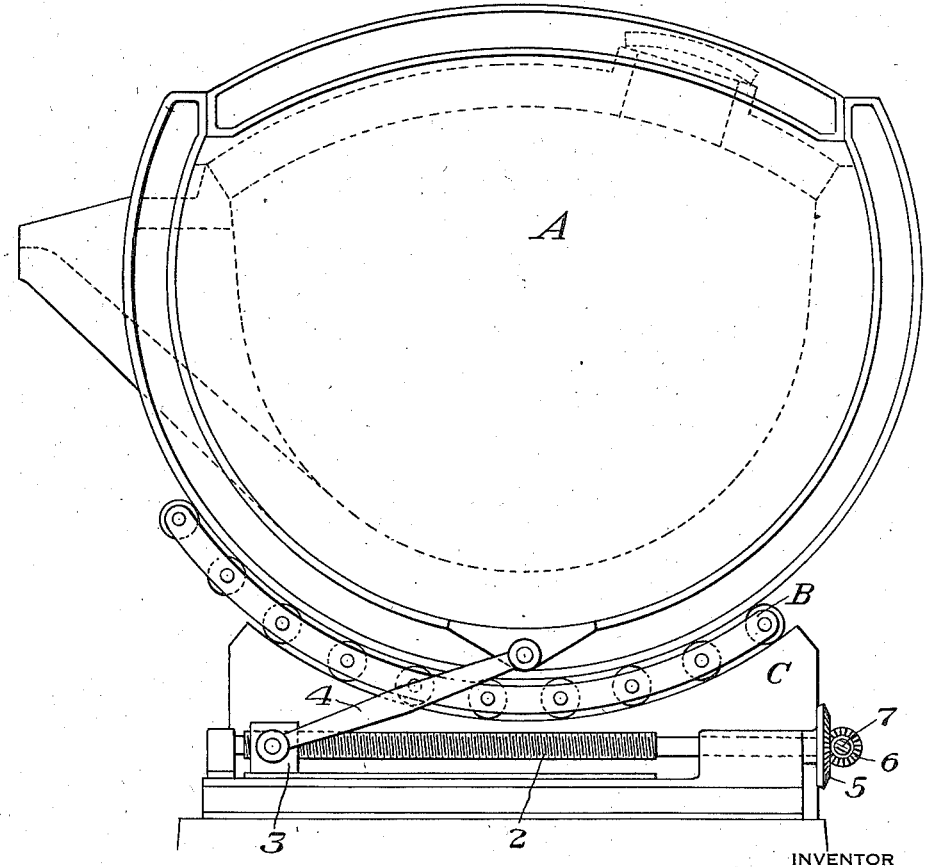

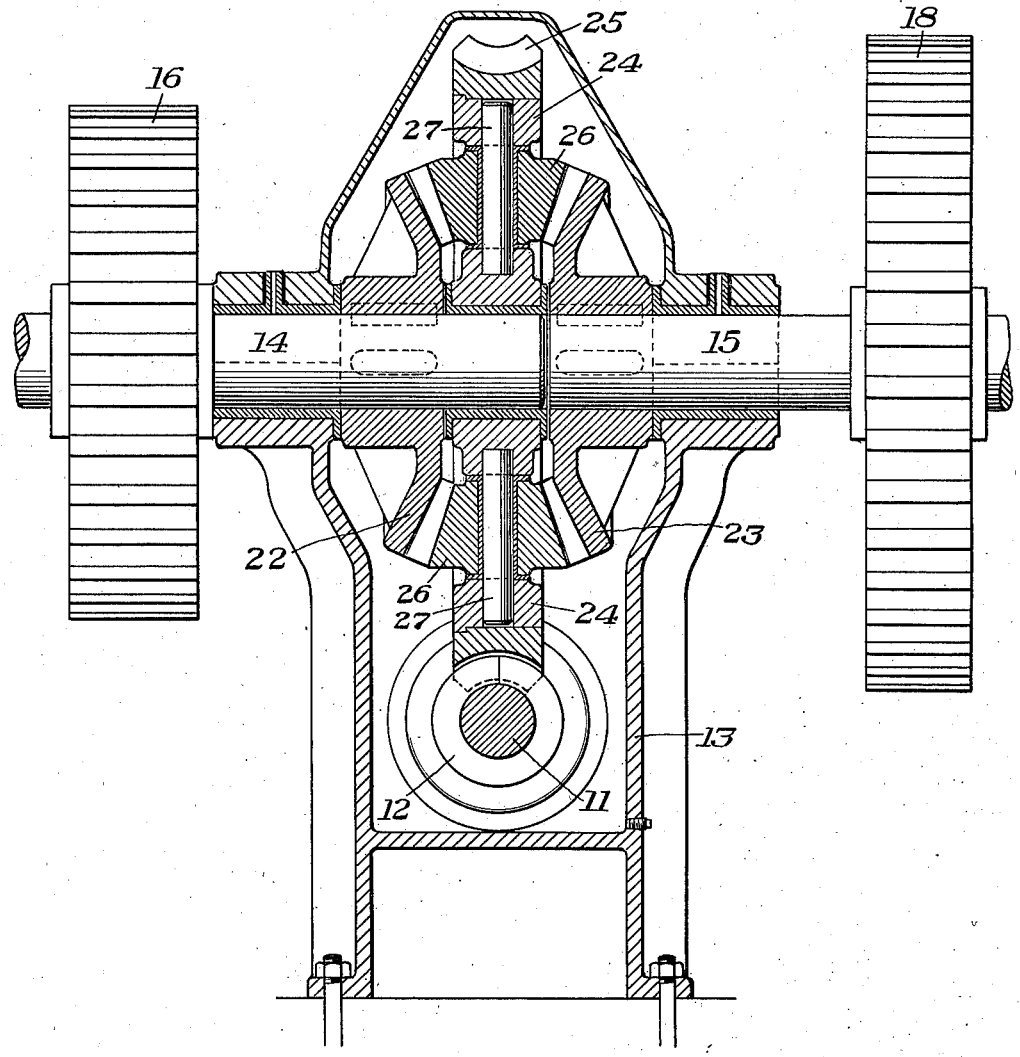

Oct. 13, 1936.  L. E. ALLEN  2,057,356

DRIVE MECHANISM FOR HOT METAL MIXERS AND THE LIKE

Filed Feb. 20, 1933   3 Sheets-Sheet 3

INVENTOR
Lee E. Allen
by his attorneys

Patented Oct. 13, 1936

2,057,356

UNITED STATES PATENT OFFICE 2,057,356

DRIVE MECHANISM FOR HOT METAL MIXERS AND THE LIKE

Lee E. Allen, New Castle, Pa., assignor to Pennsylvania Engineering Works, New Castle, Pa., a corporation of Pennsylvania Application February 20, 1933, Serial No. 657,521

2 Claims. (Cl. 266—39)

This invention relates to a drive mechanism for receptacles, such as hot metal mixers or tiltable furnaces, or other structures mounted for a rocking movement about a horizontal axis, and is for a drive arrangement permitting of the use of an auxiliary driving unit in the event of the failure of the main driving unit.

In a hot metal mixer, for instance, the mixer is mounted so that it can be tilted to discharge hot metal into a ladle car. Such mixers are usually operated by electric current. It has happened that while the mixer was tilted to the pouring position, a current failure has occurred preventing the restoration of the mixer to its normal position so that the flow of molten metal could not be stopped.

In the United States patent to Kling No. 1,892,309, dated December 27, 1932, there is disclosed an auxiliary drive for metal mixers wherein an air motor can be operatively connected to the main drive shaft of the mixer. The motor is normally disengaged from the drive shaft, and when it is necessary to use the motor, mechanism is provided for effecting the bodily movement of the motor to bring it into driving position. The arrangement has a definite advantage in that the auxiliary motor, being normally disconnected from the drive shaft, is not operated when the shaft is being driven from its main source of power and is only rotated when it is engaged with the driving shaft for operating the driving shaft. This prevents needless wear on the auxiliary motor and assures of it being kept in condition for emergency use.

According to the present invention, there is provided a main and auxiliary driving unit in which the auxiliary driving unit is at all times operatively connected with the driving system, but wherein it is effective only upon a failure of current to the main driving system. It avoids any necessity for bodily shifting the auxiliary driving motor into and out of engagement with the drive shaft, and eliminates the use of any clutches, the auxiliary driving motor always being directly geared into the driving system, but the arrangement is such, nevertheless, that the driving motor is operated or turned over only at such time as it is being used in place of the regular driving system. To effect this result use is made of a differential gearing.

The invention may be readily understood by reference to the accompanying drawings in which:

Figure 1 illustrates a mixer with the driving screw through which the mixer is tilted and showing the main driving shaft through which a plurality of positioning screws may be simultaneously operated;

Figure 2 is a more or less schematic plan view of so much of the driving system as embodies the present invention;

Figure 3 is a transverse section through the differential gearing by means of which the auxiliary driving motor is connected into the driving system.

Figure 4:
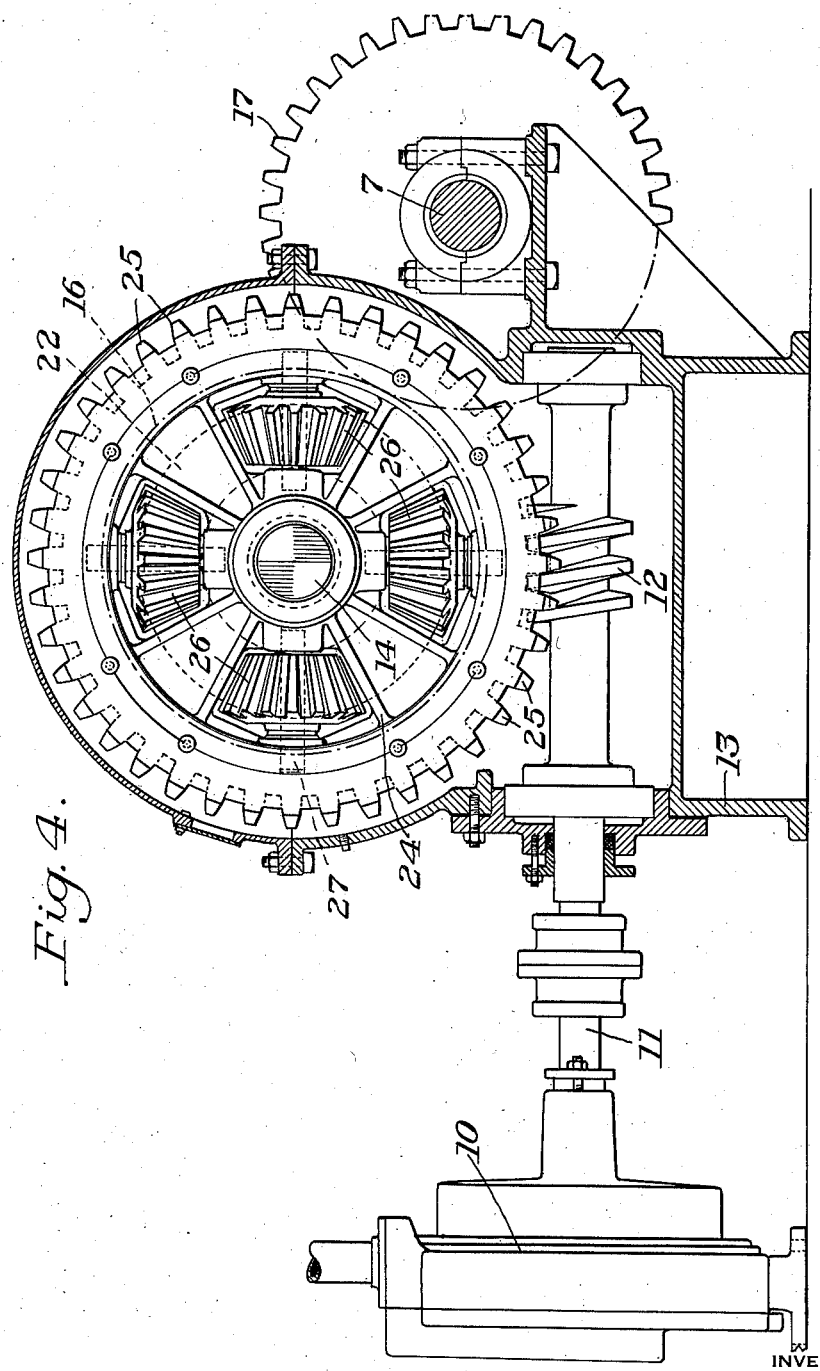
Figure 4 is a sectional elevation of the auxiliary driving unit.

Referring to the drawings, A designates a hot metal mixer, but it will be understood that in place of the mixer there may be other tiltable structure, such as a tilting open hearth furnace, or an electric furnace or other structure. This receptacle is supported for tilting motion on rollers B carried on a foundation C. The tilting motion is effected through the use of one or more screw shafts 2 which extend under the mixer. Each screw shaft carries a nut 3. The nut 3 is connected through a connecting rod 4 with the bottom of the receptacle A, the construction being one commonly found in the art. The screw shaft 2 has a bevel gear 5 at one end which engages a driving pinion 6 on a main drive shaft 7. The driving mechanism generally provided for this shaft 7 comprises an electric motor 8 which is geared to the shaft 7 through a reducing gear 9. The motor 8 is reversible so that the shaft can be rotated in either direction for tilting the receptacle to a pouring position or returning it to the position shown in Fig. 1.

According to the present invention, there is provided an auxiliary driving motor 10. This driving motor can be any type of prime mover which can be conveniently used, and for the purpose of illustration a conventional form of compressed air motor has been conventionally shown. This motor drive shaft 11 carries a worm 12, as shown in Fig. 3. The shaft 11 is received in a housing 13. Supported in this housing above the worm 12 and at right angles thereto are two shafts 14 and 15. The shaft 14 at its outer end is provided with a gear wheel 16 that meshes with a gear wheel 17 on the main drive shaft 7. The shaft 15 is provided with a brake mechanism by means of which it may be selectively rendered rotatable or held against rotation. In the embodiment shown, the shaft 15 is provided with a gear wheel 18 that meshes with a second gear 19 on a shaft 20 against which the brake 21 is effective. The brake 21 is of any known or preferred construction, and is preferably of that type commonly provided in electric hoisting machinery and other equipment wherein the brake is applied by means of a spring, and released electromagnetically. These brakes are old and well-known in the art, and I have therefore illustrated the brake in the conventional form.

The shaft 14 has on its inner end within the casing a bevel gear wheel 22, and the shaft 15 has a similar bevel gear wheel 23 keyed to its inner end. Loosely mounted on the shaft 14 between the gear wheels 22 and 23 is a differential gear frame 24 having teeth 25 around its circular periphery for engagement with the worm 12. This frame supports one or more planetary pinions 26 carried on the radially disposed shafts 27. The pinions 26 mesh with the gear wheels 22 and 23.

In the operation of the driving system, if the drive shaft is being operated by the motor 8 and the brake 21 is released, the gear 17 may drive the gear 16 which, in turn, rotates the shaft 14. The rotation of the shaft 14 causes the pinions 26 to rotate, but since the shaft 12 is stationary, the differential gear frame 24 cannot rotate. The motion of the pinions 26 is therefore transmitted to the gear wheel 23 and the shaft 15 is rotated. The operation of the main drive shaft 7 therefore takes place without causing the auxiliary driving motor 10 to turn.

When it is desired to use the auxiliary driving motor in place of the main driving motor 8, the brake 21 is set so that the shaft 15 cannot rotate. When the motor 10 rotates the shaft 11 with its worm wheel 12, the differential gear frame 24 is caused to rotate about the shaft 14. Since the shaft 15 is held against rotation, the pinions 26, being carried around with the frame 24, roll on the fixed gear wheel 23, transmitting motion to the gear wheel 22 to turn the shaft 14 and the gear 16, and thus drive the main drive shaft 7.

In the drawings I have shown the electric brake unit 21 connected through wires 28 with a source of power 29 through which the driving motor 8 is operated. Since the brake is released when it is energized, the brake will be released as long as the motor 8 is energized. When the power to the motor 8 fails, the current flow to the brake also fails, and the brake is automatically set to thus render the auxiliary driving motor 10 operable for driving the main drive shaft.

The arrangement has a further important advantage. This is that the brake 21 provides a service brake for the normal operation of the mixer. While I have shown but a single driving motor for the purpose of illustrating the invention, it is common practice to use two electric motors on the same drive shaft either of which is sufficiently powerful in the event of failure of the other to operate the mixer. The armatures of these two oversized motors develop a considerable inertia so that there is considerable drift after the current has been shut off. This has led to the adoption of service brakes for mechanisms of this kind. Heretofore the service brakes have had to be of a type which would be released either by air pressure, when the mechanism is being operated by the air motor, or by electric current when the mixer is being driven by the electric motors. With the present arrangement the brake mechanism is very much simplified because the brake remains set when the unit is being driven by the air motor. It will thus be seen that the brake 21 functions as a service brake, being released when the motor 8 is operating, and being applied when the motor 8 is stopped. In this normal use as a brake it prevents the drifting or overtravel of the mixer. At the same time, when the air drive is used, this brake still remains set, and no provision has to be made for releasing it by air pressure, as has heretofore been necessary.

It will be understood that while I have shown a specific embodiment of the invention, this is for the purpose of illustration, and that the invention is not limited to the specific construction and arrangement of parts as herein described, and various changes and modifications may be made within the contemplation of the invention and under the scope of the following claims.

I claim:

1. The combination with a tiltable receptacle of a driving shaft operatively connected with the receptacle for tilting it and having a driving unit operatively connected thereto, an auxiliary driving unit, a differential gear train through which the auxiliary driving unit is operatively connected with the drive shaft, said differential gear train having a member which when braked causes the torque from the auxiliary driving unit to be transmitted through said differential gear train to the drive shaft, and means for braking said member.

2. In a mechanism of the class described, a drive shaft, an electrically operated main driving unit for the drive shaft, an auxiliary driving motor for the drive shaft, a differential gearing through which the auxiliary motor is directly coupled with the drive shaft, an electromagnetic brake unit for controlling the operation of said differential, and a common source of power for the main driving motor and the electromagnetic brake unit whereby the brake is energized when the motor is operating, said brake being of the type which releases when energized and sets when deenergized.

LEE E. ALLEN.